(12) United States Patent
Langston

(10) Patent No.: US 7,571,870 B2
(45) Date of Patent: *Aug. 11, 2009

(54) APPARATUS, SYSTEM, AND METHOD FOR CONDENSING, SEPARATING AND STORING RECYCLABLE MATERIAL

(76) Inventor: Jody Langston, Source Industries Inc., P.O. Box 2590, Yelm, WA (US) 98597

(\*) Notice: Subject to any disclaimer, the term of this patent is extended or adjusted under 35 U.S.C. 154(b) by 496 days.

This patent is subject to a terminal disclaimer.

(21) Appl. No.: 11/110,290

(22) Filed: Apr. 20, 2005

(65) Prior Publication Data

US 2006/0060586 A1 Mar. 23, 2006

Related U.S. Application Data

(60) Provisional application No. 60/611,661, filed on Sep. 21, 2004.

(51) Int. Cl.
 *B02C 19/00* (2006.01)
(52) U.S. Cl. .............. 241/23; 241/25; 241/65; 241/37.5; 241/100; 241/101.1; 241/101.2; 100/315; 264/37.1; 209/630; 209/930
(58) Field of Classification Search .......... 241/101.2, 241/65, 23, 37.5, 101.1, 25, 100; 100/315, 100/316, 317, 337, 339; 264/37.1; 209/630, 209/702, 930
 See application file for complete search history.

(56) References Cited

U.S. PATENT DOCUMENTS

| | | | | |
|---|---|---|---|---|
| 5,172,630 A | * | 12/1992 | Thompson | 100/193 |
| 5,240,656 A | | 8/1993 | Scheeres | 264/37 |
| 5,251,832 A | * | 10/1993 | Hentschel | 241/101.76 |
| 5,257,577 A | * | 11/1993 | Clark | 100/99 |
| 5,259,304 A | * | 11/1993 | Roberts | 100/99 |
| 5,263,841 A | | 11/1993 | de Soet | 425/384 |
| 5,355,789 A | | 10/1994 | Suzuki et al. | 100/92 |
| 5,447,017 A | * | 9/1995 | Becher et al. | 53/527 |
| 5,460,085 A | | 10/1995 | Cappellari et al. | 100/37 |
| 5,489,200 A | | 2/1996 | McGraw et al. | 425/144 |
| 5,664,493 A | | 9/1997 | Kim | 100/92 |
| 5,666,878 A | | 9/1997 | Taricco | 100/73 |

(Continued)

FOREIGN PATENT DOCUMENTS

DE 9210518 10/1992

(Continued)

OTHER PUBLICATIONS

European Search Report, dated Feb. 26, 2009.

*Primary Examiner*—Mark Rosenbaum
(74) *Attorney, Agent, or Firm*—Kunzler & McKenzie

(57) ABSTRACT

An apparatus, system, and method are disclosed for condensing, separating and storing recyclable materials. The apparatus, in one embodiment, stores recyclable materials and melts the recyclable materials into a condensed form. The apparatus may include an enclosure with one or more openings to receive an item made from a recyclable material, a storage compartment to enable removal of stored recyclable materials, at least one heating module to melt the recyclable material into a condensed form, and a receptacle configured to retain a melted form of the recyclable material. Thus, the recyclable material may be easily and conveniently stored for reprocessing. The apparatus may further separate the recyclable material according to the type of recyclable material.

14 Claims, 4 Drawing Sheets

U.S. PATENT DOCUMENTS

| | | | |
|---|---|---|---|
| 5,740,725 A | 4/1998 | Tomizawa et al. | 100/92 |
| 5,813,323 A * | 9/1998 | Nowak | 100/52 |
| 5,814,790 A | 9/1998 | Bondeson et al. | 219/421 |
| 5,832,818 A | 11/1998 | Menzak, Jr. | 100/92 |
| 6,141,945 A * | 11/2000 | Becher | 53/527 |

FOREIGN PATENT DOCUMENTS

| | | |
|---|---|---|
| DE | 9403770 | 6/1994 |
| DE | 4338640 | 5/1995 |
| DE | 4340857 A | 6/1995 |
| DE | 4407600 | 9/1995 |

* cited by examiner

APPARATUS, SYSTEM, AND METHOD FOR CONDENSING, SEPARATING AND STORING RECYCLABLE MATERIAL

CROSS-REFERENCES TO RELATED APPLICATIONS

This application claims priority to U.S. Provisional Patent Application No. 60/611,661 entitled "APPARATUS, SYSTEM, AND METHOD FOR CONDENSING, SEPARATING AND STORING RECYCLABLE MATERIAL" and filed on Sep. 21, 2004 for Jody Langston, which is incorporated herein by reference.

BACKGROUND OF THE INVENTION

1. Field of the Invention

This invention relates to devices for storing recyclable materials and more particularly relates to appliances for condensing, separating and storing recyclable materials.

2. Description of the Related Art

Recycling efforts to reduce, reuse, and recycle manufactured products have been a concern of both government agencies and individuals worldwide. In the past thirty years as landfills continue to fill with waste, government officials have taken an active role in passing legislation to protect the environment and to conserve our natural resources. Some legislation has included laws requiring individuals to reprocess recyclable materials.

The recycling process of identifying recyclable materials, preparing the materials for storage, and storing the recyclable materials for reprocessing, however, can be troublesome and even difficult to execute at times. Traditionally, households and businesses have collected and stored recyclable items in cardboard boxes or designated recycling containers until the items can be delivered to a recycling center or processing facility. Individual containers typically separate different types of recyclable materials. The items generally must be compacted or condensed, as the boxes tend to fill relatively quickly with just a few items. As the containers fill, the piled refuse often resembles messy clutter or mounds of garbage; an undesirable sight to see, especially in heavily frequented areas.

Also, overflowing items tend to intermingle, causing contamination of the recyclable materials. For example, if different types of plastic or glass are mixed, the materials are no longer suitable for reprocessing. Consequently, the contaminated items are shipped to the landfill, causing laborious recycling efforts to be wasted.

One particular type of recyclable item that seems omnipresent is plastic bags, such as plastic grocery bags. Plastic bags can function for many purposes and are often stored for reuse as well as for recycling. Yet storing plastic bags often presents many problems. First of all, the number of plastic bags stored generally fluctuates as bags are accumulated and reused at varying rates. As a result, finding a convenient location to store the bags may be difficult. A small container under the sink may overflow after a few visits to the grocery store. In contrast, a large container may be nearly empty after finding a suitable use for the bags.

Secondly, a large, voluminous collection of plastic bags may be required to substantiate recycling efforts. Plastic bags are commonly made from an ultra-thin thermoplastic. Accordingly, the plastic bags are generally light weight and easily produced. However, to accumulate a relatively significant amount of recyclable material, several large containers of plastic bags may be needed, especially since crumpled bags tend to expand and are not easily retained in a compact form. Storing large conspicuous containers of plastic bags is generally undesirable, especially in small households.

Thirdly, plastic bags may consist of varying types of recyclable materials and may need to be identified and separated for reprocessing, similar to other recyclable materials. Common types of recyclable materials used for plastic bags may include #2 HDPE and #4 LDPE. Thus, designating separate containers for storing the different types of plastic bags may further contribute to a large number of containers required for reprocessing recyclable materials. Other kinds of recyclable materials may impose similar problems.

From the foregoing discussion, it should be apparent that a need exists for an apparatus, system, and method that condenses, separates and stores recyclable materials in an inconspicuous place that prevents the recyclable materials from becoming contaminated. Beneficially, such an apparatus, system, and method would reduce the volume of the recyclable materials, separate the materials into distinct types, and store the materials in a convenient receptacle that eliminates mess and clutter. The apparatus, system, and method would simplify recycling efforts and maximize recycling benefits.

SUMMARY OF THE INVENTION

The present invention has been developed in response to the present state of the art, and in particular, in response to the problems and needs in the art that have not yet been fully solved by currently available recycling devices. Accordingly, the present invention has been developed to provide an apparatus, system, and method for condensing, separating, and storing recyclable materials that overcome many or all of the above-discussed shortcomings in the art.

The apparatus to condense, separate, and store recyclable materials is provided with a logic unit containing one or more modules configured to functionally execute the necessary steps of melting a recyclable material into a condensed form. The modules in the described embodiments include at least one heating module.

The apparatus, in one embodiment, stores recyclable materials and melts the recyclable materials into a condensed form. The apparatus may include an enclosure, one or more openings to receive an item made from a recyclable material, a storage compartment to enable removal of stored recyclable materials, at least one heating module to melt the recyclable material into a condensed form, and a receptacle configured to retain a melted form of the recyclable material. Thus, the recyclable material may be easily and conveniently stored for reprocessing. A weight within the enclosure may further facilitate condensing the recyclable material in certain embodiments.

The apparatus is further configured, in one embodiment, to separate and identify the type of recyclable material. A receptacle such as a mold may retain the melted recyclable material and may further form an identifying mark on the material. In select embodiments, the apparatus includes multiple storage compartments to separate the various types of recyclable materials. The distinct materials may subsequently be condensed into separate receptacles. A selection module may further select a type of recyclable material, a specific storage compartment, and/or a certain receptacle. The selection may be manual or automatic. In certain embodiments, the receptacle(s) and/or the storage compartments may be coated with a non-stick substance such as Teflon® to facilitate removal of the recyclable materials.

In a further embodiment, the apparatus may be configured to monitor the condition of the recyclable material and surrounding environment. The apparatus, in certain embodiments, may include one or more sensors to monitor the condition of the heating module, the recyclable material, the enclosure, and the like. In addition, the apparatus may further include a safety module to guard the heating module. In one embodiment, the safety module comprises a timed lock to prevent the heating module and associated materials from contacting combustible items and the like. A cover hinged to the enclosure may be locked in a closed position to prevent access to stored materials when the heating module is activated. The apparatus, in certain embodiments, may be a home appliance for personal use.

A system of the present invention is also presented to condense, store and separate recyclable materials. In one embodiment, the system may be embodied in an appliance with modular units. In particular, the system may include an enclosure to store recyclable materials, one or more openings in the enclosure configured to receive an item made from a recyclable material, a storage compartment to enable removal of stored recyclable materials, a plurality of form altering modules configured to alter the form of an item made from a recyclable material to prepare the recyclable material for storage, and one or more form altering modules configured to melt the recyclable material into a condensed form.

The system may further include a receptacle to retain a melted form of the recyclable material, a selection module to select a type of recyclable material, a director module to automatically direct a recyclable material to a receptacle according to the type of material selected, a sensor to monitor the condition of the recyclable material and surrounding environment, and a safety module to guard one or more form altering modules.

A method of the present invention is also presented for condensing, separating and storing recyclable materials. The method in the disclosed embodiments substantially includes the steps necessary to carry out the functions presented above with respect to the operation of the described apparatus and system. In one embodiment, the method includes providing an appliance comprising an enclosure, at least one opening in the enclosure to receive an item made from a recyclable material, one or more storage compartments to enable removal of stored recyclable materials, and one or more heating modules configured to melt the recyclable material into a condensed form. The method also may include inserting a recyclable material into an opening in the enclosure, storing the recyclable material for reuse, and melting the recyclable material into a condensed form.

In a further embodiment, the method includes selecting a type of recyclable material and separating different types of recyclable materials to prevent contamination. The recyclable materials and surrounding environment may additionally be monitored to effectively and safely condense the recyclable material. The recyclable material may subsequently be stored in a condensed form.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention stores and melts recyclable materials, such as plastic, to a condensed form. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
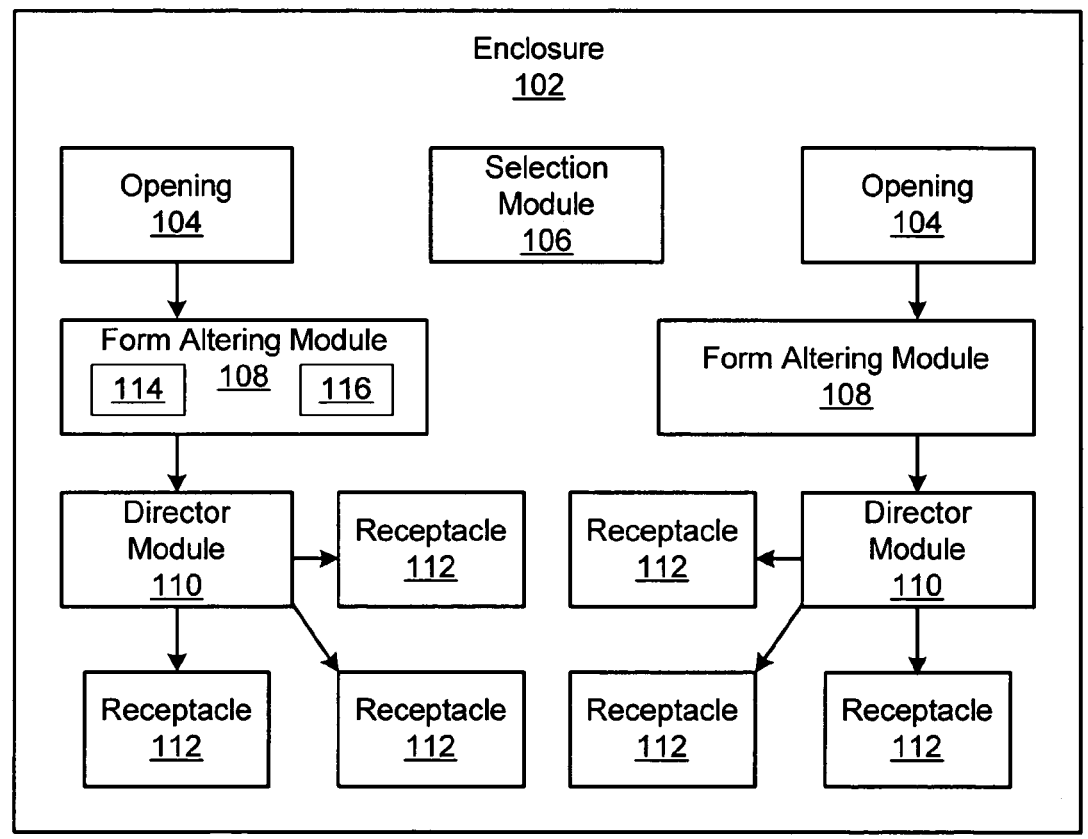
FIG. 1 is a schematic block diagram illustrating one embodiment of a storage system of the present invention for condensing, separating, and storing recyclable materials.

FIG. 1 depicts one embodiment of a storage system 100 in accordance with the present invention. In the illustrated embodiment, the storage system 100 comprises an enclosure 102, openings 104, a selection module 106, form altering modules 108, director modules 110, and receptacles 112. The storage system 100 condenses, separates, and stores recyclable materials. In certain embodiments, one or more modules may be combined to accomplish the objectives of the invention. In a contemplated embodiment, the storage system 100 is embodied in an appliance suitable for home or office use, thereby providing a convenient way to store recyclable materials, either in a native form for reuse or in a condensed form for reprocessing.

The enclosure 102, in one embodiment, is configured to fit into a relatively small room, such as a kitchen or a break room, and may resemble a dishwashing machine or a large paper shredder. Alternatively, the enclosure 102 may have a variety of forms, which may be intended to accommodate one or more particular types of recyclable materials. In one embodiment, the enclosure 102 may be configured to house various modular units to alter the form of recyclable materials to prepare the recyclable materials for storage.

One or more openings 104 in the enclosure 102 allow a user to place a recyclable material into a receiving area to be condensed. The enclosure 102 may or may not include a door or covering to cover the openings 104. In certain embodiments, the enclosure 102 additionally comprises one or more openings to permit access to the receptacles 112. In one embodiment, the receptacles 112 are concealed within the enclosure 102. Alternatively, the receptacles 112 may be remotely located outside of the enclosure 102. The enclosure 102 may further include a control panel to allow a user to direct the processes within the enclosure 102. In one embodiment, the user may press one or more buttons to activate the selection module 106 and/or the director modules 110.

The selection module 106 may be used to identify or select a type of recyclable material. In certain embodiments, the selection module 106 may include sensors and/or other devices to automatically identify a type of recyclable material. For example, the selection module 106 may identify a plastic milk container placed in the opening 104 as a #2 HDPE recyclable material. In one embodiment, an ultra sonic sensor is used to detect the shape and/or proportions of the recyclable item. Alternatively, the selection module 106 may be activated responsive to a manual selection. The selection module 106, in conjunction with the director module 110, may then direct the item according to the type of recyclable material selected.

In an alternative embodiment, a plurality of openings 104 facilitate the selection process. For example, one opening 104 may be configured to receive paper products; another opening 104, metals; another, glass; another, plastic; and so forth. The selection module 106 may be utilized to determine a type of recyclable material within a determined category. For instance, the selection module 106 may be used to select a color of glass (brown, green, and clear) received into an opening 104 designated for glass. The selection module 106, in conjunction with the director module 110, then separates the different colored glass to prevent the materials from mixing and becoming contaminated.

The form altering modules 108 reduce the size of a recyclable material to prepare the recyclable material for storage. Traditionally, boxes, cartons, soda cans, plastic containers and the like are flattened to conserve space. The form altering modules 108 efficiently condense the recyclable materials using a variety of technologies. For example, a form altering module 108 may comprise devices such as shredders, crushers, compactors, cutters, burners, lasers, and the like. Those of skill in the art will recognize that a variety of devices and/or technologies may be used and/or combined to accomplish the task of condensing recyclable materials. The scope of the present invention is not limited, therefore, to the described embodiments.

Furthermore, the form altering modules 108 may be modular units selectively combined to condense selected recyclable materials. In one embodiment, a system 100 comprises a variety of interchangeable form altering modules 108. Alternatively, a determined set of form altering modules 108 may be combined in a small appliance. In a further embodiment, a system 100 may comprise a combination of independent modular units and substantially integrated form altering modules 108.

In a select embodiment, the storage system 100 comprises a form altering module 108 configured to melt the recyclable materials into a condensed form. The form altering module 108 may comprise a heating module, such as a heating element, to apply heat to the recyclable material. In addition, a storage compartment 114 within the form altering module 108 may facilitate removal of items stored for reuse. A receptacle 116 may also be disposed within the form altering module 108 for retaining a melted form of the recyclable material. The recyclable material may subsequently be melted into the receptacle 116, in certain embodiments, until the material cools and may be directed to a receptacle 112 outside of the form altering module 108. Of course, alternative configurations may be suitable.

The director module 110, in one embodiment, responds to a selection made with the selection module 106. For example, if a green colored glass is selected with the selection module 106, the director module 110 directs the green glass material to a receptacle 112 designated for green glass. Alternatively, if brown glass is selected, the director module 110 directs the brown glass material to a receptacle 112 designated for brown glass. The director module 110 separates the recyclable materials to prevent the different recyclable materials from being mixed. The individual receptacles 112 may store the condensed materials until the materials can be transferred to a processing facility.

In one embodiment, the director module 110 comprises a chute that is positioned relative to a selection made with the selection module 106. A condensed recyclable material may subsequently be directed down a chute and deposited into a designated receptacle 112. Alternatively, the director module 110 may position the receptacles 112 in order to receive the appropriate recyclable material. Further still, the form altering module 108 may be directed accordingly to deposit the recyclable material into a corresponding receptacle 112. Those of skill in the art will recognize that various methods may be used to direct a selected recyclable material to an appropriate receptacle 112.

Furthermore, the receptacles 112 may be arranged in a variety of configurations within the enclosure 102 of the storage system 100. Receptacles 112 may be aligned along the bottom of the enclosure 102. Alternatively or in addition, the receptacles 112 may be vertically stacked. Furthermore, the receptacles 112 may be compact to conserve space within the enclosure 102. In an alternative embodiment, the receptacles 112 may be remotely located outside of the enclosure 102 as mentioned above.

In a contemplated embodiment, the system 100 melts recyclable materials, such as plastic bags and the like, to create a condensed molded form suitable for storage. One or more form altering modules 108 may further be embodied in a separate recycling appliance, such as the modular unit described above, or a as a single function apparatus.

Figure 2:
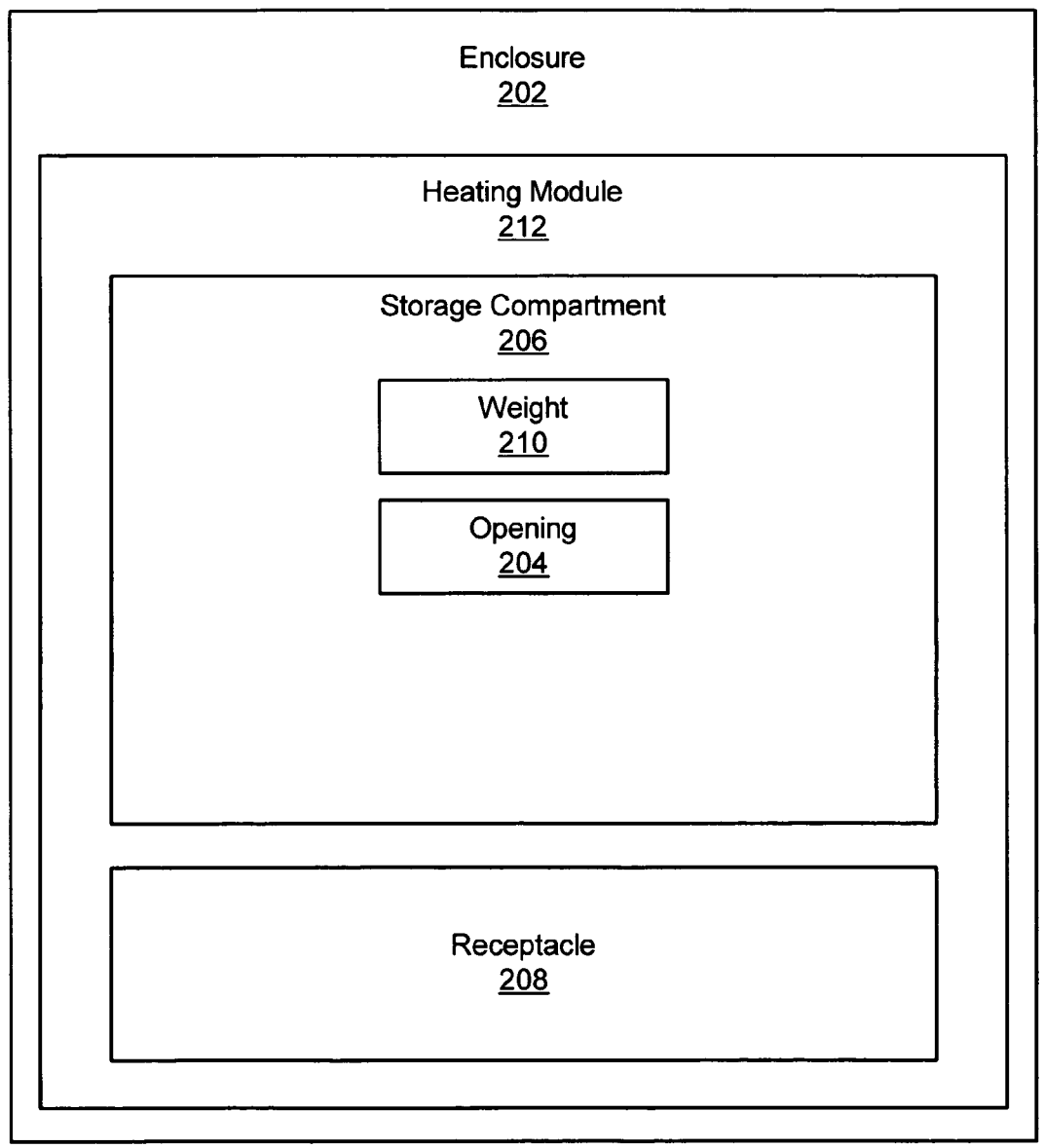
FIG. 2 is a schematic block diagram illustrating one embodiment of a recycling appliance of the present invention.

FIG. 2 illustrates one embodiment of a recycling appliance 200 for condensing, separating, and storing recyclable materials. The appliance 200 in the depicted embodiment comprises an enclosure 202, an opening 204, a storage compartment 206, a receptacle 208, a weight 210, and a heating module 212. The heating module 212 enables the recycling appliance 200 to melt recyclable materials for storage.

In one embodiment, the enclosure 202 may resemble the enclosure 102 described in relation to FIG. 1. The enclosure 202 may comprise a small box-shaped appliance (about the size of toaster oven or microwave in certain embodiments) suitable to be stored in a kitchen or the like. In addition, the enclosure 202 may be made of a durable material and may be aesthetically pleasing. In certain embodiments, the enclosure 202 is stylized to complement a decorative theme.

The opening 204 enables a user to place recyclable materials, such as plastic bags and the like, inside the enclosure 202. The opening 204 may further include a covering, such as a hinged door. In one embodiment, the opening 204 enables recyclable materials to be stored in the storage compartment 206 such that the user can readily access the materials when desired.

In one embodiment, the storage compartment 206, which corresponds to the form altering module 108 of FIG. 1 in certain embodiments, facilitates temporary storage of the recyclable material. In one embodiment, one or more walls of the storage compartment 206 comprise one or more walls of the enclosure 202. The storage compartment 206 may retain an unaltered recyclable item for storage before condensing. Consequently, the item may be removed for reuse.

In the depicted embodiment, the appliance 200 comprises a weight 210 positioned within the storage compartment 206. In a further embodiment, the weight 210 comprises a heating module 212. Of course, one or more weights 210 with or without heating modules 212 may be applied to the recyclable material from multiple directions. The weight 210 preferably facilitates condensing the recyclable material.

In one embodiment, a weight 210 drops down on top of the recyclable materials to compact the material. In the case of plastic bags, the weight 210 forces trapped air out of the plastic material, which additionally localizes the material for heating. Alternatively, other methods may be employed to compress the recyclable material and to facilitate melting the recyclable material. Heat and pressure may be applied to the recyclable material simultaneously.

A heating module 212 may subsequently supply heat to the recyclable material. In one embodiment, the heating module 212 is similar to a heating element used in a conventional oven. A heating module 212 may be located in the top and/or bottom of the storage compartment 206. Alternatively or in addition, one or more heating modules 212 may be located in the sides of the storage compartment 206. Those of skill in the art will recognize that various configurations of heating modules 212 may be possible. In one embodiment, the heating module 212 heats the recyclable material at about 225-250 degrees Fahrenheit.

In one embodiment, the heating element 212 melts the recyclable material in the storage compartment 206. The walls of the storage compartment 206 may be coated with a non-stick substance such as Teflon® to prevent the melted material from sticking. In certain embodiments, the melted material may cool, and harden in some embodiments, within the storage compartment 206, forming a condensed form of the recyclable material.

The condensed material may subsequently be stored in a receptacle 208 to be reprocessed. In one embodiment, the bottom of the storage compartment 206 opens to release the condensed material into a storage receptacle 208. Alternatively, the user may remove the condensed material to be stored in a remote location. In a further embodiment, the receptacle 208 comprises a mold suitable for receiving the melted recyclable material. In one embodiment, the receptacle 208 is coated with Teflon® or another stick-resistant substance. In addition, the receptacle 208 may or may not be removable. In a contemplated embodiment, a receptacle 208 may comprise a drawer that may be extended from the enclosure 202 to enable removal of the condensed material. A receptacle 208 such as a mold may be disposed within the drawer in certain embodiments. In one embodiment, the receptacle 208 may be removed from the drawer. In an alternative embodiment, the receptacle 208 is integral to the drawer.

Figure 3:
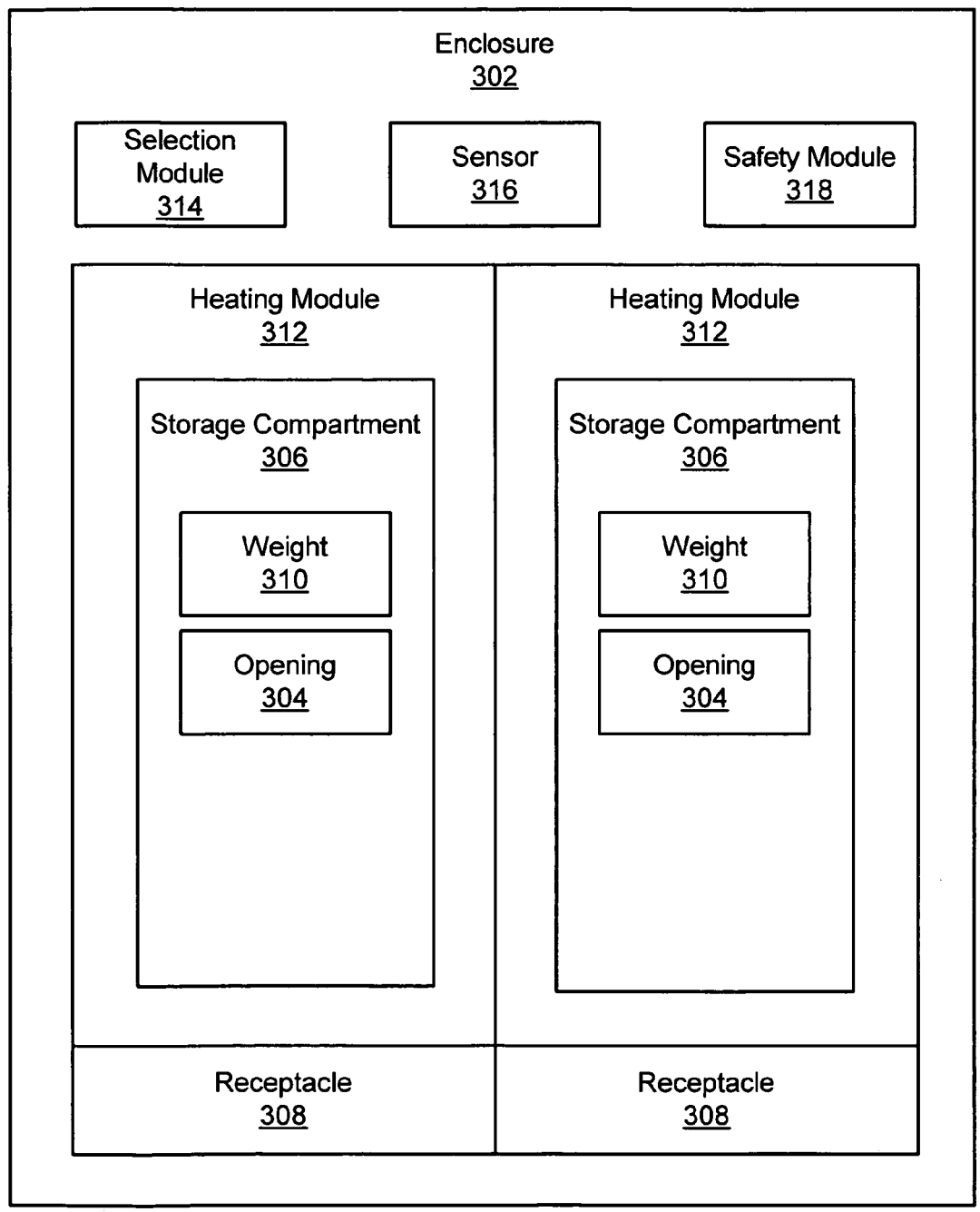
FIG. 3 is a schematic block diagram illustrating an alternative embodiment of a recycling appliance of the present invention.

FIG. 3 illustrates an alternative embodiment of a recycling apparatus 300. The recycling apparatus 300 as depicted includes an enclosure 302, openings 304, storage compartments 306, receptacles 308, weights 310, heating modules 312, a selection module 314, a sensor 316, and a safety module 318. The recycling apparatus 300 may function similarly to the recycling apparatus 200 described in relation to FIG. 2. Specifically, the recycling apparatus 300 may further provide for separation of different types of recyclable materials.

The selection module 314 may select the type of recyclable material. In one embodiment, the user selects a type of recyclable material by pressing a button or selecting a control on a control panel. A selection may additionally activate one or more heating modules 312. In certain embodiments, the selection module 314 further directs the sensor 316 and the safety module 318.

In a contemplated embodiment, a selection of one type of recyclable material may result in the selected material being condensed while the unselected types of recyclable materials remain unaffected. Individual receptacles 308 corresponding to a type of recyclable material may include an identification marker to identify the type of recyclable material. In one embodiment, the receptacle 308 comprises a mold with an identifying mark formed into the mold. Thus, when a melted form of the recyclable material fills the mold, the resulting condensed form may contain an identifying mark.

For example, a storage compartment 306 may contain plastic bags made of #4 LDPE. When the storage compartment 306 reaches full capacity, the user may select the #4 plastic with the selection module 314 to melt the plastic bags. The receptacle 308 at the bottom of the storage compartment 306 may contain the identifying mark #4 LDPE formed into a mold. Consequently, the selected heating module 312 melts the plastic, and the corresponding receptacle 308 molds the condensed material, which may resemble a hard plastic bar, to bear the identifying mark #4 LDPE.

One or more sensors 316 may monitor the condition of the recyclable material and surrounding environment. In one embodiment, a thermometer measures the temperature of the heating module 312 and of the recyclable material. One or more sensors 316 may communicate data to the heating module 312 or to the safety module 318. The received data may influence the modules 316, 318. For example, an extreme temperature may temporarily disable the heating module 312. Absence of a covering or of a receptacle 308 may activate the safety module 318 in certain embodiments.

The safety module 318 guards at least one heating module 312. In one embodiment, the safety module 318 comprises a timed lock. Consequently, a covering to the opening 304 and to the receptacle 308 may be locked during the melting and cooling process. The safety module 318 may further comprise an alarm, an automated covering, and/or the like.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Additionally, the order in which a particular method occurs may or may not strictly adhere to the order of the corresponding steps shown.

Figure 4:
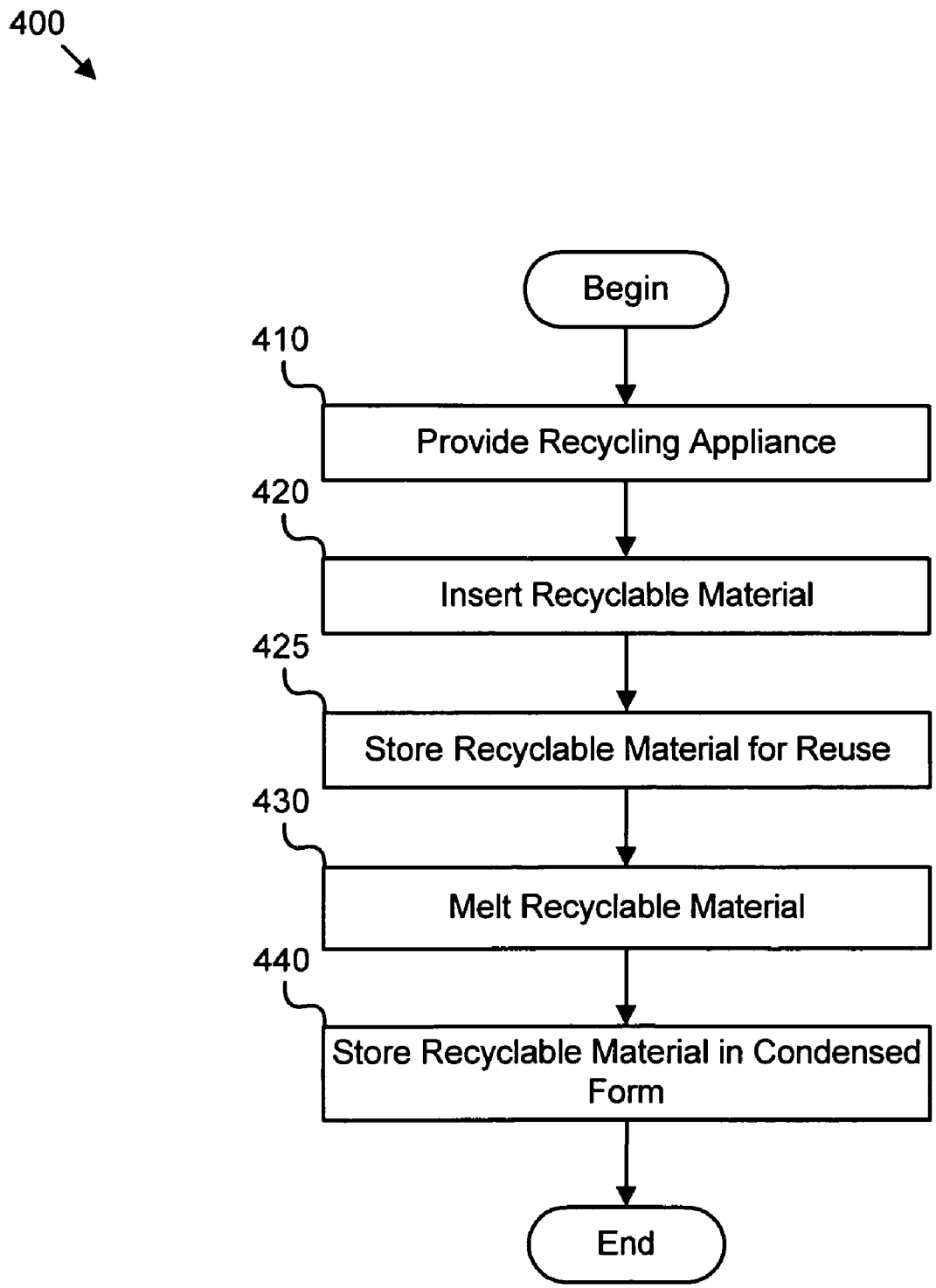
FIG. 4 is a schematic flow chart diagram illustrating one embodiment of a recycling method of the present invention for condensing, separating, and storing recyclable materials.

FIG. 4 illustrates one embodiment of a recycling method 400 for condensing, separating and storing recyclable materials. In the depicted embodiment, the recycling method 400 includes providing 410 a recycling appliance, inserting 420 a recyclable material into the recycling appliance, storing 425 the recyclable material for reuse, melting 430 the recyclable material, and storing 440 the recyclable material in a condensed form. The recycling appliance may comprise an appliance similar to those described in FIGS. 1-3. For illustrative purposes, the recycling method 400 will be described with reference to the recycling appliance 300 of FIG. 3. The scope of the invention, however, but is not limited to the described embodiment.

In one embodiment, the user identifies a recyclable material and inserts 420 the recyclable material into an opening 304 of a recycling apparatus 300. A plurality of openings 304 may enable the user to access a plurality of storage compartments 306. Consequently, different types of recyclable materials may be separated into different storage compartments 306 to prevent contamination. The storage compartment 306 may temporarily store 425 the recyclable materials for reuse. As a result, the user may additionally remove recyclable materials from the storage compartment 306.

At the user's discretion, the selection module 314 may be employed to select a type of recyclable material for condensing in certain embodiments. In one example, the user may wish to condense the items in a storage compartment 306 that is filled to capacity. After user's selection, the chosen recyclable material may be melted 430.

The heating module 312 may subsequently melt 430 the selected recyclable material into a receptacle 308. A sensor 316 may monitor the condition of the recyclable material and surrounding environment. In addition, a weight 310 may compress the recyclable material to facilitate the condensing process. In one embodiment, the weight 310 compresses the recyclable material into a removable receptacle 308.

The safety module 318 may provide a timed lock that prevents the user from removing the receptacle 308 during activation of the heating module 312. In certain embodiments, the safety module 318 receives data from one or more sensors 316, such as a temperature of the recyclable material, to enable the safety module 318 to adjust safety features accordingly, such as access to the recyclable material. For example, a cover locked or sealed in a closed position may prevent the user from contacting heated materials. In one embodiment, the user removes the hardened, condensed recyclable material for reprocessing, and the storage compartment 206 subsequently may be used to store additional recyclable materials, either for reuse or for condensing.

The user may store 440 the recyclable material in a condensed form for reprocessing. In one embodiment, the form altering module 108 of FIG. 1 reduces the size of the recyclable material, and the director module 110 directs the recyclable material to a storage receptacle 112. The receptacle 112 subsequently stores the condensed form of the recyclable material. Storing a condensed form of the recyclable material facilitates separating recyclable materials and prevents cluttered messes and material contamination. In addition, smaller, more attractive containers may be used to conveniently retain the recyclable materials for reprocessing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An appliance for condensing, separating and storing recyclable materials, the apparatus comprising:
   an enclosure configured to store recyclable materials;
   at least one opening in the enclosure configured to receive an item made from a recyclable material;
   a selection module configured to select a type of recyclable material;
   at least one storage compartment within the enclosure, the at least one storage compartment configured to enable removal of stored recyclable materials;
   at least one heating module configured to melt the recyclable material into a melted form;
   a safety module comprising a timed lock to lock a cover in a closed position over the at least one opening when the at least one heating module is activated;
   at least one receptacle disposed within the enclosure, the at least one receptacle configured to retain the melted form of the recyclable material; and
   a director module configured to automatically direct the melted form of the recyclable material to the at least one receptacle in response to the selection made with the selection module.

2. The apparatus of claim 1, wherein the at least one receptacle comprises a mold configured to form an identifying mark on the recyclable material.

3. The apparatus of claim 1, wherein the at least one receptacle comprises a non-stick coating.

4. The apparatus of claim 1, wherein the at least one receptacle is disposed within a drawer for removal of the condensed recyclable material.

5. The apparatus of claim 1, further comprising a weight configured to facilitate condensing the recyclable material.

6. The apparatus of claim 1, further comprising at least one sensor configured to monitor a condition of the recyclable material and surrounding environment.

7. The apparatus of claim 1, the safety module further configured to guard the at least one heating module.

8. A system for condensing, separating and storing recyclable materials, the system comprising:
   an enclosure configured to store recyclable materials;
   at least one opening in the enclosure configured to receive an item made from a recyclable material;
   a selection module configured to select a type of recyclable material;
   at least one storage compartment within the enclosure, the at least one storage compartment configured to enable removal of stored recyclable materials;
   at least one receptacle disposed within the enclosure, the at least one receptacle configured to retain a melted form of the recyclable material;

a plurality of form altering modules configured to alter the form of an item made from a recyclable material to prepare the recyclable material for storage;

at least one of the form altering modules configured to melt the recyclable material into the melted form;

a safety module comprising a timed lock to lock a cover in a closed position over the at least one opening when at least one of the form altering modules is activated; and a director module configured to automatically direct the melted form of the recyclable material to the at least one receptacle in response to the selection made with the selection module.

9. The system of claim 8, wherein the at least one receptacle comprises a mold configured to form an identifying mark on the recyclable material.

10. The system of claim 8, further comprising at least one sensor configured to monitor a condition of the recyclable material and surrounding environment.

11. A method for condensing, separating and storing recyclable materials, the method comprising:

providing an appliance comprising;

an enclosure configured to store recyclable materials;

at least one opening in the enclosure configured to receive an item made from a recyclable material;

a selection module configured to select a type of recyclable material;

at least one storage compartment within the enclosure, the at least one storage compartment configured to enable removal of stored recyclable materials;

at least one heating module configured to melt the recyclable material into a melted form; and at least one receptacle disposed within the enclosure, the at least one receptacle configured to retain the melted form of the recyclable material;

a director module configured to automatically direct the melted form of the recyclable material to the at least one receptacle in response to the selection made with the selection module;

inserting a recyclable material into an opening in the enclosure;

storing the recyclable material in the at least one storage compartment for reuse; and melting the recyclable material into the melted form.

12. The method of claim 11, further comprising separating different types of recyclable materials.

13. The method of claim 11, further comprising monitoring a condition of the recyclable material and surrounding environment.

14. The method of claim 11, further comprising storing the recyclable material in a condensed form.

\* \* \* \* \*